US012603075B2

(12) United States Patent
Kuo et al.

(10) Patent No.: US 12,603,075 B2
(45) Date of Patent: Apr. 14, 2026

(54) ACTIVE AUDIO ADJUSTMENT METHOD AND HOST

(71) Applicant: HTC Corporation, Taoyuan City (TW)

(72) Inventors: Yan-Min Kuo, Taoyuan City (TW); I Yun Su, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 183 days.

(21) Appl. No.: 18/592,531

(22) Filed: Mar. 1, 2024

(65) Prior Publication Data

US 2024/0296820 A1 Sep. 5, 2024

Related U.S. Application Data

(60) Provisional application No. 63/449,602, filed on Mar. 3, 2023.

(51) Int. Cl.

*G10K 11/16* (2006.01)
*G10K 11/175* (2006.01)
*G10K 11/178* (2006.01)

(52) U.S. Cl.

CPC .... *G10K 11/1752* (2020.05); *G10K 11/17823* (2018.01)

(58) Field of Classification Search

CPC ...................... G10K 11/1752; G10K 11/17823
USPC ................................................ 381/73.1, 71.1
See application file for complete search history.

(56) References Cited

U.S. PATENT DOCUMENTS

2020/0007984 A1* 1/2020 Rivera Benois .... G10L 21/0232
2022/0417647 A1 12/2022 Sun et al.
2025/0046290 A1* 2/2025 Özçelik ................ H04R 1/1083
2025/0181309 A1* 6/2025 Kemmerer ....... G10K 11/17837

FOREIGN PATENT DOCUMENTS

CN 107666637 A * 7/2016
CN 107666637 2/2018
CN 117321681 A * 12/2023 ......... G10L 21/0232
TW 201042985 12/2010
TW 201804816 2/2018

OTHER PUBLICATIONS

"Office Action of Taiwan Counterpart Application", issued on Feb. 26, 2025, p. 1-p. 7.

* cited by examiner

*Primary Examiner* — Ammar T Hamid
(74) *Attorney, Agent, or Firm* — JCIPRNET

(57) ABSTRACT

The embodiments of the disclosure provide an active audio adjustment method. The active audio adjustment method includes: receiving, by a host, an ambient sound from a sound pickup device; analyzing, by the host, the ambient sound to obtain an ambient parameter of the ambient sound and determine an adjustment strategy; adjusting, by the host, an original parameter of an output audio to determine an optimized parameter based on the ambient parameter of the ambient sound and the adjustment strategy; generating, by the host, an optimized output audio based on the optimized parameter; and outputting, by the host, the optimized output audio to an audio output device.

16 Claims, 6 Drawing Sheets

ACTIVE AUDIO ADJUSTMENT METHOD AND HOST

CROSS-REFERENCE TO RELATED APPLICATION

This application claims the priority benefit of U.S. provisional application Ser. No. 63/449,602, filed on Mar. 3, 2023. The entirety of the above-mentioned patent application is hereby incorporated by reference herein and made a part of this specification.

BACKGROUND

Technical Field

The disclosure relates to an active audio adjustment method; particularly, the disclosure relates to an active audio adjustment method and a host.

Description of Related Art

Open-back headphones and closed-back headphones are two of the most common types of headphones on the market. They differ in the way they seal around the ears, which has a significant impact on their sound quality, comfort, and ability to block out ambient noise.

For the closed-back headphones, active noise cancellation is a technology that uses sound waves to reduce unwanted noise (e.g., ambient noise). Active noise cancellation works by creating a sound wave that is 180 degrees out of phase with the unwanted noise. These two waves cancel each other out, creating a quieter listening environment, creating improving listening experience. However, for open-back headphones, since the ambient sound can pass through the headphones, the active noise cancellation may not be able to create effective sound waves to cancel out the ambient sound.

SUMMARY

The disclosure is direct to an active audio adjustment system and an active audio adjustment method, so as to improve listening experience for wearable audio playback devices.

The embodiments of the disclosure provide an active audio adjustment method. The active audio adjustment method includes: receiving, by a host, an ambient sound from a sound pickup device; analyzing, by the host, the ambient sound to obtain an ambient parameter of the ambient sound and determine an adjustment strategy; adjusting, by the host, an original parameter of an output audio to determine an optimized parameter based on the ambient parameter of the ambient sound and the adjustment strategy; generating, by the host, an optimized output audio based on the optimized parameter; and outputting, by the host, the optimized output audio to an audio output device.

The embodiments of the disclosure provide a host. The host includes a storage circuit and a processor. The storage circuit is configured to store a program code. The processor is coupled to the storage circuit and configured to access the program code to execute: receiving an ambient sound from a sound pickup device; analyzing the ambient sound to obtain an ambient parameter of the ambient sound and determine an adjustment strategy; adjusting an original parameter of an output audio to determine an optimized parameter based on the ambient parameter of the ambient sound and the adjustment strategy; generating an optimized output audio based on the optimized parameter; and outputting the optimized output audio to an audio output device.

Based on the above, according to the active audio adjustment method and the host, by generating the output audio based on the optimized parameter, the user may clear hear the output audio in a noisy environment without manually turning up the volume, thereby improving the listening experience for wearable audio playback devices.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
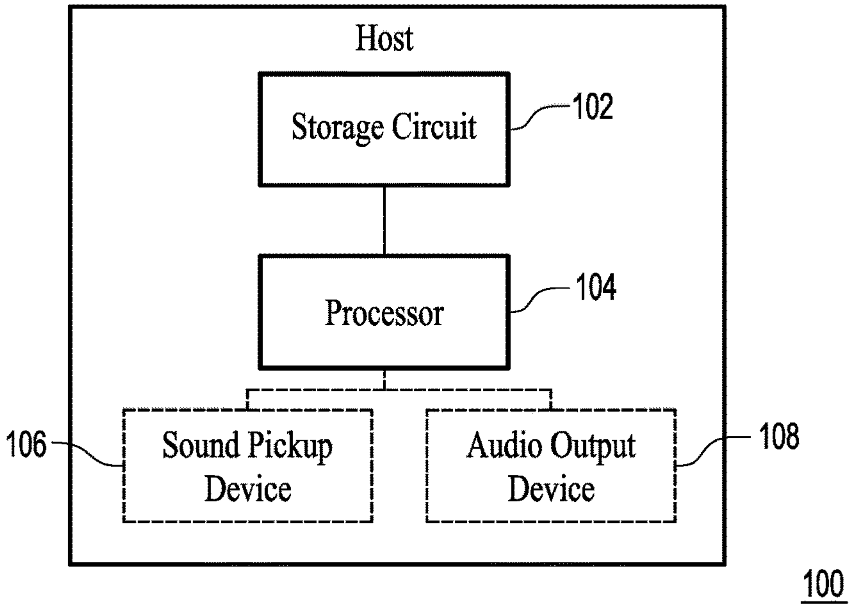
FIG. 1 is a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

Open-back headphones or open-back sound devices are often used to provide audio content to the user. Open-back headphones are a type of headphone that allows ambient sound to pass through. Open-back headphones often have a more natural and spacious soundstage than closed-back headphones. This is because they do not block out ambient sound, which can give the music a more realistic and immersive feel. Further, open-back headphones may be more comfortable to wear for extended periods of time than closed-back headphones. This is because they do not create a seal around the ears, which can lead to pressure buildup and fatigue.

However, open-back headphones may not be suitable for active noise cancellation, since the ambient sound can pass through the open-back headphones. That is, in noisy environments, users may need to turn up the volume of open-back headphones to hear the sound inside the headphones clearly. It is worth mentioned that, manually adjusting the volume may be inconvenient and time-consuming. In addition, a loud volume may be harmful to hearing and lead to missing important sounds in the environment. Therefore, it is the pursuit of people skilled in the art to provide an improved listening experience for wearable audio playback devices.

FIG. 1 is a schematic diagram of a host according to an embodiment of the disclosure. In various embodiments, a host 100 may be any smart device and/or computer device. In some embodiments, the host 100 may be any electronic device capable of providing reality services (e.g., AR/VR/MR services, or the like). In some embodiments, the host 100 may be implemented as an XR device, such as a pair of AR/VR glasses and/or a head-mounted display (HMD) device. In some embodiments, the host 100 may be a computer and/or a server, and the host 100 may provide the computed results (e.g., AR/VR/MR contents) to other external display device(s) (e.g., the HMD device), such that the external display device(s) can show the computed results to the user. However, this disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or a program code that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the host 100 may further include a sound pickup device 106 or the host 100 may be coupled to the sound pickup device 106. The sound pickup device 106 may be a microphone, a sonar, other similar devices, or a combination of these devices.

In some embodiments, the host 100 may further include an audio output device 108 or the host 100 may be coupled to the audio output device 108. The audio output device 108 may be a audio playback device, an open-back sound device, an open-back headphone, a speaker, a megaphone, other similar devices, or a combination of these devices. That is, the audio output device 108 may allow ambient sound to pass through. However, this disclosure is not limited thereto.

In some embodiments, the host 100 may further include a communication circuit and the communication circuit may include, for example, a wired network module, a wireless network module, a Bluetooth module, an infrared module, a radio frequency identification (RFID) module, a Zigbee network module, or a near field communication (NFC) network module, but the disclosure is not limited thereto. That is, the host may communicate with external device(s) (such as a microphone, a speaker, or the like) through either wired communication or wireless communication.

In the embodiments of the disclosure, the processor 104 may access the modules and/or the program code stored in the storage circuit 102 to implement the active audio adjustment method provided in the disclosure, which would be further discussed in the following.

Figure 2:
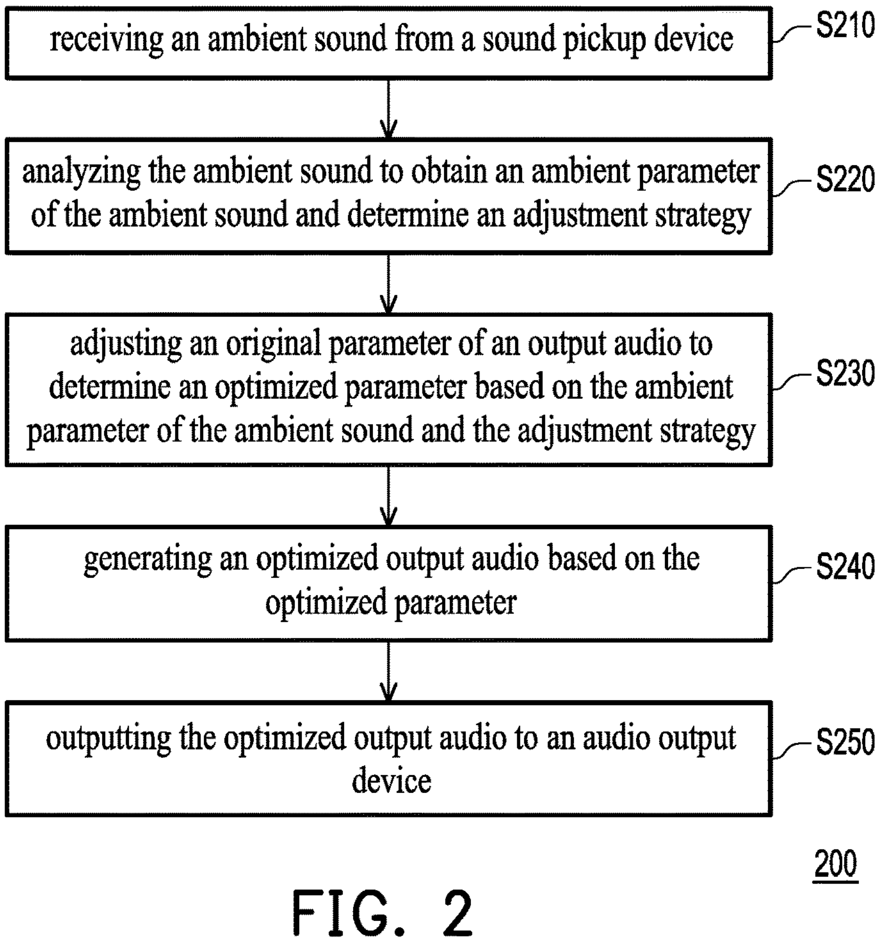
FIG. 2 is a schematic flowchart of an active audio adjustment method according to an embodiment of the disclosure.
Figure 3A:
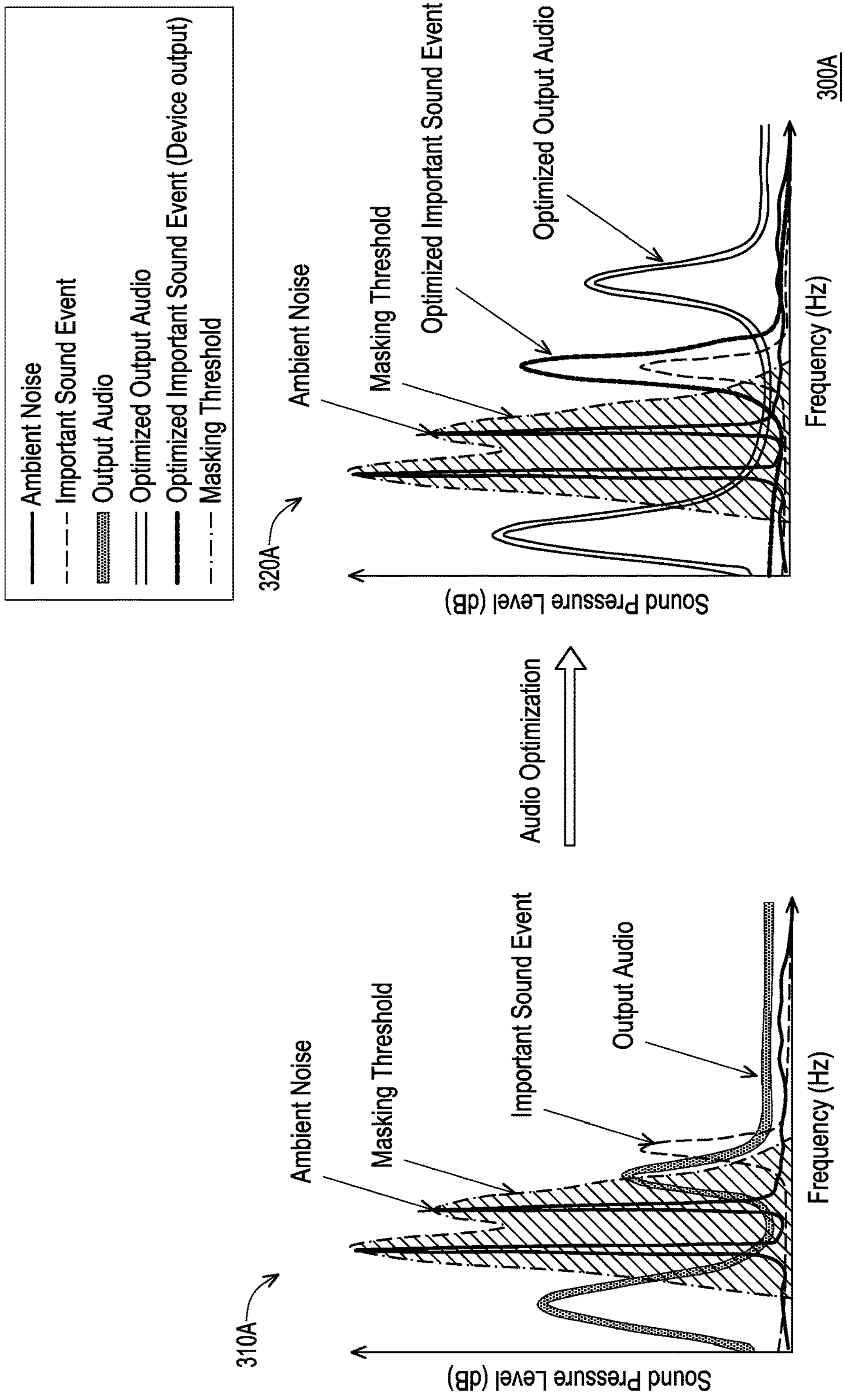
FIG. 3A is a schematic diagram of an active audio adjustment scenario according to an embodiment of the disclosure.

FIG. 2 is a schematic flowchart of an active audio adjustment method according to an embodiment of the disclosure. The method of this embodiment may be executed by the host 100 in FIG. 1, and the details of each step in FIG. 2 will be described below with the components shown in FIG. 1. In addition, for better understanding the concept of this disclosure, FIG. 3A will be used as an example, wherein FIG. 3A shows an application scenario according to an embodiment of the disclosure. In FIG. 3A, an active audio adjustment scenario 300A includes an original frequency spectrum 310A and an optimized frequency spectrum 320A.

In a step S210, an ambient sound may be obtained by the sound pickup device 106 and the ambient sound may be provided to the processor 104. The ambient sound may include various sounds around the user, because the sound pickup device 106 (e.g., included in the host 100) may be close to a user or may be worn by the user.

In one embodiment, the ambient sound may include ambient noise (e.g., machine noise, traffic noise, sound of chatter, or the like), an important sound event (e.g., siren, warning sound, sound of ambulance, shout, yelling, or the like), or other sounds. The ambient sound may pass through the audio output device 108 (e.g., the open-back headphone) and may be heard by the user. Meanwhile, the host 100 may output audio signals through the audio output device 108 and these audio signals may be referred to as "output audio" or "device output" as shown in FIG. 3A. That is, the user may hear the ambient sound (including the ambient noise and/or the important sound event) and the output audio at the same time.

It is noteworthy that, the ambient noise may make it difficult for the user to hear other sounds (e.g., the important sound event or the output audio). In one embodiment, as shown in the original frequency spectrum 310A of FIG. 3A, the ambient noise may include sounds with narrow frequency ranges. For example, the ambient noise may have two prominent (sharp) peaks at two specific frequencies. That is, the user may find it difficult to hear other sounds at these two specific frequencies. Moreover, due to a masking effect of the ambient noise, the user may find it difficult to hear other sounds not only at the same frequency as the ambient noise, but also at nearby frequencies. It is worth mentioned that, in this disclosure a "frequency" of a sound may represent "center frequency" of the sound, but is not limited thereto. That is, an impact of ambient noise may extend to nearby frequencies, which is depicted as a "masking threshold" in FIG. 3A or referred as a "masking range". In one embodiment, the masking threshold may be determined utilizing a pre-trained psychoacoustics model, but is not limited thereto. That is, the pre-trained psychoacoustics model may be trained to analyze the masking effect of a sound. In one embodiment, a threshold value may be used to determine whether other sounds being affected by the ambient noise or not. The threshold value may be determined based on the masking effect of the ambient noise. For example, the threshold value may be a specific frequency difference between (a center frequency of) the ambient noise and (a center frequency of) a sound. While a frequency difference between the ambient noise and the sound is not greater than the threshold value, the sound is affected by the ambient noise. On the other hand, while a frequency difference between the ambient noise and the sound is greater than the threshold value, the sound is not affected by the ambient noise. Similarly, the masking effect may be also applied to the important sound event and the output audio. That is, when the user hear the ambient noise, the important sound event and/or the output audio at the same time, a masking effect of each of the ambient noise, the important sound event and/or the output audio may affect each other.

In a step S220, the ambient sound may be analyzed to obtain an ambient parameter of the ambient sound and determine an adjustment strategy. The ambient parameter may include an ambient frequency of the ambient sound and/or an ambient energy level (i.e., the volume, shown as "sound pressure level" on the figure) of the ambient sound. The adjustment strategy may be used to determine an optimized parameter of an optimized output audio and/or an optimized important sound parameter of optimized an important sound event.

In one embodiment, the ambient sound may include a plurality of sounds (e.g., the ambient noise and/or the important sound event) and the ambient sound may be further analyzed to categorize (classify) the plurality of sounds in the ambient sound. For example, each of the plurality of sounds in the ambient sound may be categorized as either the ambient noise or the important sound event. The categorizing may be performed based on a sound database or a pre-trained model, but is not limited thereto. Further, during the analysis of the ambient sound, each of the plurality of sounds may be analyzed to find out its own parameter. For example, the ambient parameter may include a noise parameter and/or an important sound parameter. The noise parameter may include a noise frequency and/or a noise energy level of the ambient noise. The important sound parameter may include an important sound frequency and/or an important sound energy level of the important sound event. However, this disclosure is not limited thereto.

In a step S230, an original parameter of an output audio may be adjusted to determine an optimized parameter based on the ambient parameter of the ambient sound and the adjustment strategy. The output audio may be originally designed to be played with the original parameter. Due to the influence of the ambient sound, an optimized output audio may be generated and the optimized output audio may be played with the optimized parameter. For example the optimized parameter of the optimized output audio may be determined based on the masking effect of ambient sound utilizing the pre-trained psychoacoustics model.

In one embodiment, as shown in the original frequency spectrum 310A of FIG. 3A, the output audio may have two dominant peaks. The peak on a left side, with a lower frequency, may be referred to as a first peak. The peak on a right side, with a higher frequency, may be referred to as a second peak. It is worth mentioned that, since most of the first peak does not overlap with the masking threshold (masking range) of the ambient sound (e.g., the ambient noise and/or the important sound event), the user may still hear the first peak of the output audio clearly under the influence of the ambient sound. On the other hand, since most of the second peak overlaps with the masking threshold (masking range) of the ambient noise, the user may not be able to hear the second peak of the output audio clearly under the influence of the ambient noise. Moreover, since part of the second peak overlaps with the important sound event, the important sound event may also hinder the user's comprehension of the output audio.

Reference is now made to the optimized frequency spectrum 320A of FIG. 3A. In the optimized frequency spectrum 320A, the original parameter of the output audio is adjusted to determine the optimized parameter based on the ambient parameter to generate the optimized output audio. It is worth mentioned that, the device output with the original parameter may be referred to as a "raw output audio" and the device output with the optimized parameter may be referred to as the "optimized output audio". In one embodiment, to enhance an auditory intelligibility of the first peak of the output audio, an energy level of the first peak may be amplified. This kind of adjustment strategy may be referred to as "equalizer optimization" (e.g., by a dynamic equalizer), but is not limited thereto. That is, the original parameter of the output audio and the optimized parameter of the optimized output audio may include, respectively, an original energy level of the first peak and an optimized energy level of the first peak. In one embodiment, the optimized parameter (e.g., the optimized energy level) may be determined by comparing the original parameter of output audio with the ambient parameter of the ambient sound. For example, the ambient parameter may include the noise energy level of the ambient noise. By comparing the original energy level with the noise energy level, the optimized energy level may be determined. To put it briefly, the original energy level of the output audio may be adjusted to determine the optimized energy level based on an ambient energy level (e.g., the noise energy level) of the ambient sound, wherein the optimized energy level is greater than the ambient energy level. However, this disclosure is not limited thereto.

In another embodiment, to enhance an auditory intelligibility of the second peak of the output audio, a frequency of the second peak may be shifted to separate the second peak from the masking threshold (masking range). This kind of adjustment strategy may be referred to as "pitch shift optimization" or "frequency modulation", but is not limited thereto. That is, the original parameter of the output audio and the optimized parameter of the optimized output audio may include, respectively, an original frequency of the second peak and an optimized frequency of the second peak. In one embodiment, the masking threshold (masking range) of the ambient sound (e.g., the ambient noise and/or the important sound event) may be determined based on a masking effect of the ambient sound. The optimized parameter of the optimized output audio may be determined based on an overlapping frequency band of the masking threshold (masking range) and an original frequency band of the output audio. To put it briefly, the original frequency of the output audio may be adjusted to determine the optimized frequency of the optimized output audio based on an ambient frequency of the ambient sound (e.g., the noise frequency or the masking range of the ambient noise and/or the important sound frequency or the optimized important sound frequency), wherein a frequency difference between the optimized frequency and the ambient frequency is greater than a threshold value. However, this disclosure is not limited thereto.

In addition, to further enhance the auditory intelligibility of the second peak, an energy level of the second peak may be amplified at the same time. That is, the original parameter of the output audio and the optimized parameter of the optimized output audio may further include, respectively, an original energy level of the second peak and an optimized energy level of the second peak. To put it briefly, the original energy level and the original frequency of the output audio may be adjusted, respectively, to determine the optimized energy level and the optimized frequency of the optimized output audio based on the ambient sound. However, this disclosure is not limited thereto.

In yet another embodiment, since part of the second peak overlaps with the important sound event, the important sound event may also hinder the user's comprehension of the output audio. Further, a masking effect of the important sound event may also occur. For ease of illustration, a masking threshold (masking range) of the important sound event is not depicted on the figure. That is, the optimized parameter of the optimized output audio may be determined based on the noise parameter of the ambient noise and/or the important sound parameter of the important sound event. In other words, the whole ambient sound (including the ambient noise and/or the important sound event) may be utilized to enhance an auditory intelligibility of the output audio. However, this disclosure is not limited thereto.

In a step S240, the optimized output audio may be generated based on the optimized parameter, which is shown in optimized frequency spectrum 320A of FIG. 3A.

In a step S250, the optimized output audio may be outputted to the audio output device 108. That is, instead of the raw output audio, the user may experience the optimized output audio. Therefore, the active audio adjustment method 200 may deliver a demonstrably improved soundscape for the wearable audio playback devices, thereby increasing the user experience.

Reference is now made back to original frequency spectrum 310A of FIG. 3A again. During the analysis of the ambient sound, the processor 104 may be configured to determine whether an important sound event being included in the ambient sound or not. In one embodiment, each of the plurality of sounds may be determined being an important sound event or not based on a sound database. However, this disclosure is not limited thereto. It is noteworthy that, since part of the important sound event overlaps with the masking threshold ambient noise and the output audio, the masking threshold ambient noise and the output audio may hinder the user's comprehension of the important sound event. That is to say, the user may not be able to hear the important sound event clearly, which may hinder rapid response of the user and may pose a potential safety risk.

Reference is now made to the optimized frequency spectrum 320A of FIG. 3A. In order to overcome potential interference from the ambient noise and/or the output audio, the host 100 may generate an optimized important sound event based on the important sound event. To be more specific, content (e.g., frequency and shape) of the optimized important sound event may be same as or similar as the important sound event, but an optimized important sound energy level of the optimized important sound event may be greater than a original important sound energy level of the important sound event. It is noted that, to ensure a faithful reproduction of the important sound event, the important sound frequency may remain unaltered. Further, after the optimization of the important sound event, the original important sound event does not disappear. That is, the user may hear the important sound event and the optimized important sound event at the same time. Therefore, an auditory intelligibility of the important sound event may be enhanced to prevent an accident from happening. In other words, when there is no important sound event detected in the ambient sound, the audio output device 108 may be configured to output optimized output audio only. Alternatively, when there is an important sound event detected in the ambient sound, the audio output device 108 may be configured to output the optimized output audio and the optimized important sound event at the same time. In this manner, while the user is immersed in the effects of optimized output audio, the user may simultaneously be aware of the important sound event in the surrounding environment, thus enhancing both immersion and safety.

Figure 3B:
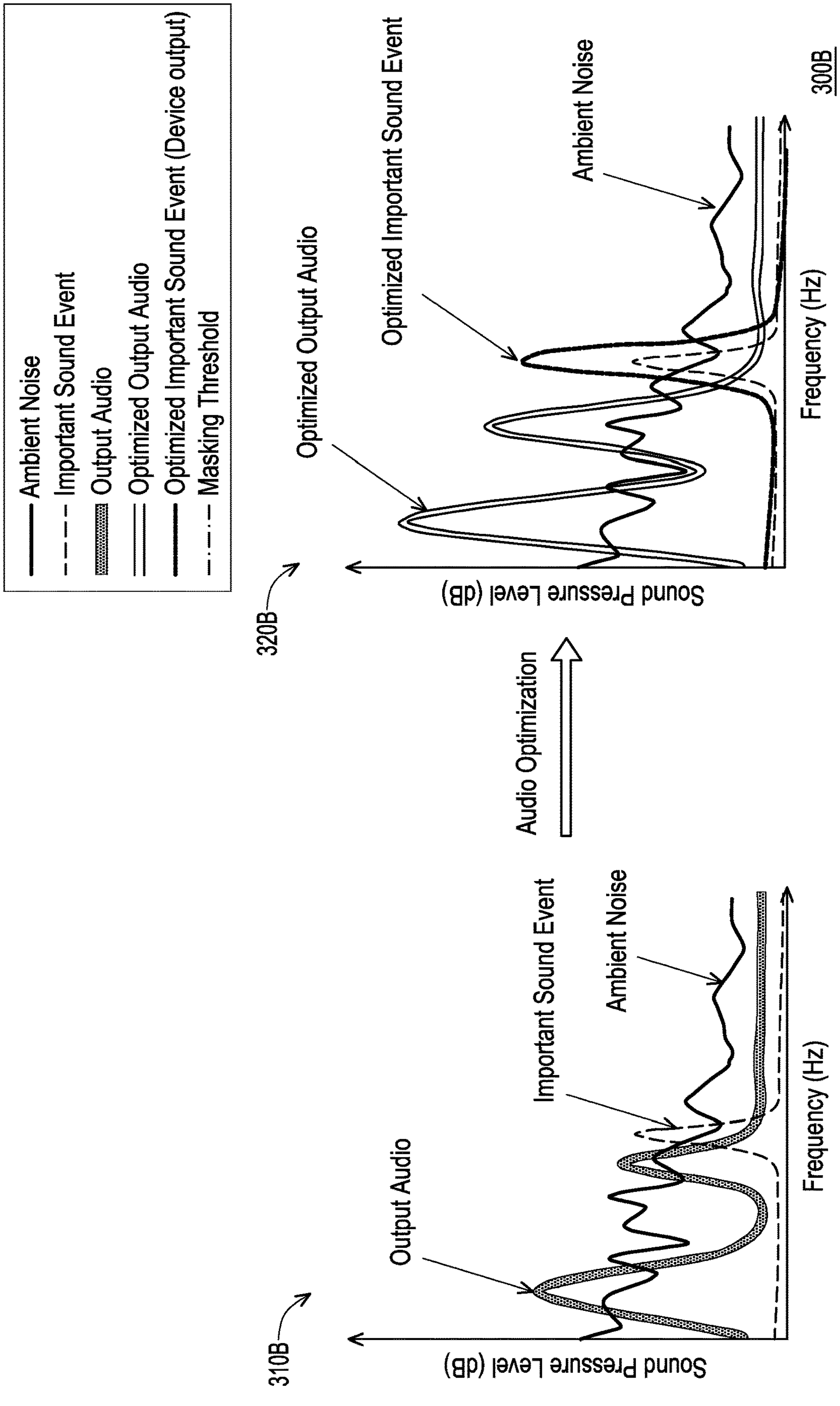
FIG. 3B is a schematic diagram of an active audio adjustment scenario according to an embodiment of the disclosure.

FIG. 3B is a schematic diagram of an active audio adjustment scenario according to an embodiment of the disclosure. With reference to FIG. 3B, an active audio adjustment scenario 300B includes an original frequency spectrum 310B and an optimized frequency spectrum 320B. A main difference between FIG. 3A and FIG. 3B is that the ambient noise in FIG. 3B is not concentrated in a narrow frequency band, but rather has a wider frequency spectrum.

Reference is first made to the original frequency spectrum 310B of FIG. 3B. The output audio may have two dominant peaks. The peak on a left side, with a lower frequency, may be referred to as a first peak. The peak on a right side, with a higher frequency, may be referred to as a second peak. It is worth mentioned that, peaks in the ambient noise are more like flat peaks rather than sharp peaks. That is, there are not prominent peaks in the ambient noise.

Reference is first made to the optimized frequency spectrum 320B of FIG. 3B. In order to enhance an auditory intelligibility of the output audio, instead of shifting an original frequency of the output audio, an original energy level may be amplified. This kind of adjustment strategy may be referred to as "frequency band enhancement optimization", but is not limited thereto. That is, both of the energy levels of the first peak and the second peak of the output audio may be amplified. However, this disclosure is not limited thereto.

In addition, when there is no important sound event detected in the ambient sound, only the output audio may be optimized. That is, the audio output device 108 may be configured to output optimized output audio only. Alternatively, when there is an important sound event detected in the ambient sound, both the output audio and the important sound event may be optimized. That is, the audio output device 108 may be configured to output the optimized output audio and the optimized important sound event at the same time.

It is noteworthy that, reference is now made to FIG. 3A and FIG. 3B at the same time. When the ambient noise includes peaks with narrow frequency bands, "pitch shift optimization" or "frequency modulation" may be determined as an adjustment strategy for generating the optimized output audio. On the other hand, when the ambient noise includes a wider frequency spectrum, "frequency band enhancement optimization" may be determined as the adjustment strategy for generating the optimized output audio. That is, the processor 104 may be configured to determine an adjustment strategy for generating the optimized output audio based on a pattern of the ambient noise.

Figure 4A:
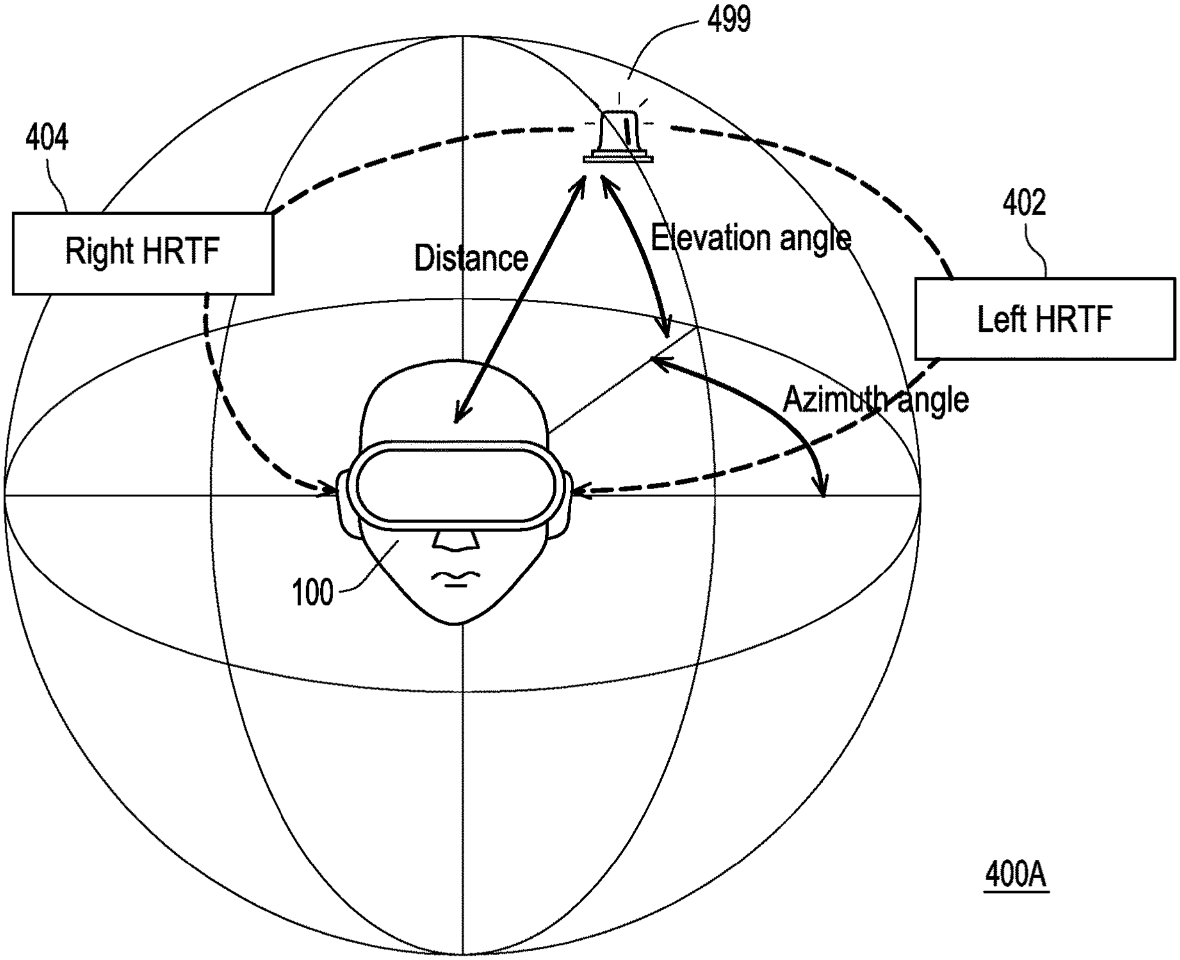
FIG. 4A is a schematic diagram of an active audio adjustment scenario according to an embodiment of the disclosure.

FIG. 4A is a schematic diagram of an active audio adjustment scenario according to an embodiment of the disclosure. With reference to FIG. 4A, an active audio adjustment scenario 400A depicts that the host 100 (depicted as the HMD device) is worn on the user and the ambient sound includes an important sound event 499.

In one embodiment, during the analysis of the ambient sound, the processor 104 of the host 100 may be configured to determine a direction and a distance of the important sound event 499 relative to the user utilizing a well-known technology (e.g., time difference of arriving, beam forming, machine learning model, or the like). For example, a distance from the user to the important sound event 499 may be determined. In addition, an elevation angle and an azimuth angle from the user to the important sound event 499 may be determined.

Next, the processor 104 may be configured to generate the optimized important sound event based on the direction and the distance utilizing a spatial audio effect algorithm. That is, while the user hears the optimized important sound event from the audio output device 108, the user may be able to know the direction and the distance of the important sound event 499. In one embodiment, a left head related transfer function (HRTF) 402 and a right HRTF 404 may be utilized (e.g., by convolution) to generate the optimized important sound event. Further, the details of a process of generating the optimized important sound event will be described below with the components shown in FIG. 4B.

Figure 4B:
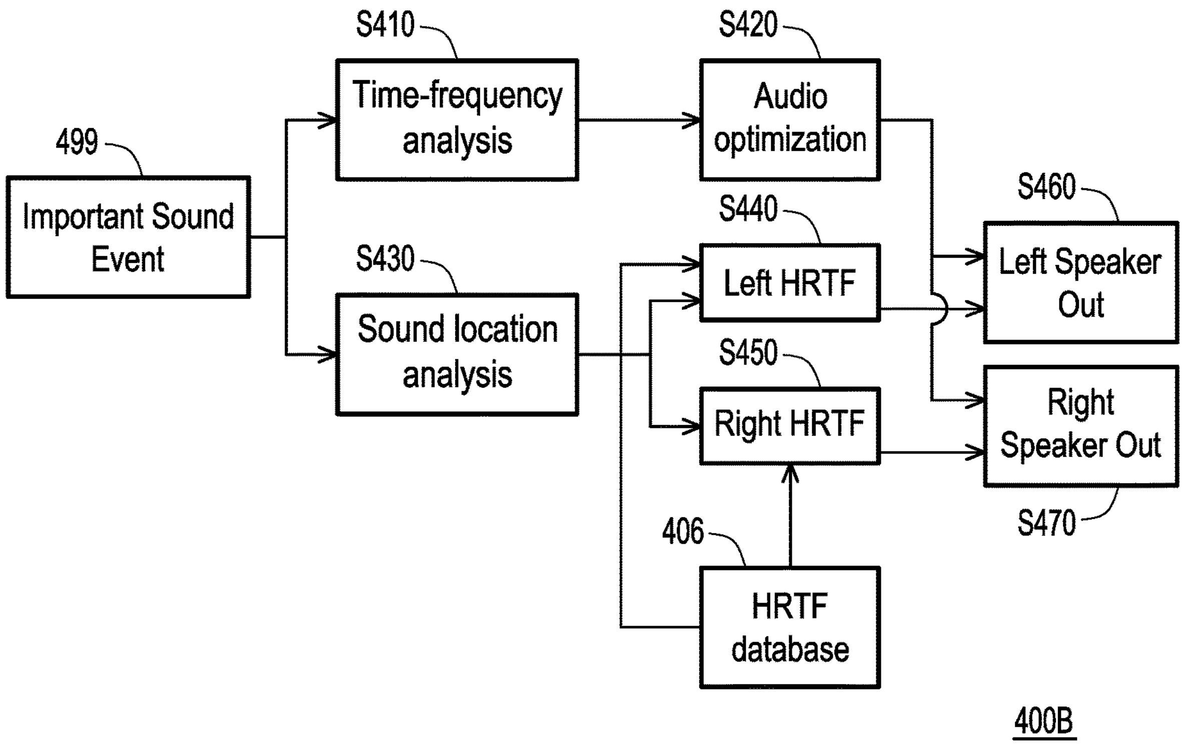
FIG. 4B is a schematic diagram of an active audio adjustment scenario according to an embodiment of the disclosure.

FIG. 4B is a schematic diagram of an active audio adjustment scenario according to an embodiment of the disclosure. With reference to FIG. 4B, during the analysis, one of the plurality of sounds in the ambient sound may be categorized as the important sound event 499. That is, the ambient sound may include the important sound event 499.

In a step S410, a time-frequency analysis may be performed to analyze a change of frequency distribution of the important sound event 499 over time. It is worth mentioned that, a traditional Fourier transform (e.g., Short Time Fourier Transform, STFT) can only obtain the frequency distribution of a signal at a specific time point, while time-frequency analysis can obtain the frequency distribution of a signal at different time points. In a step S420, based on a result of the time-frequency analysis, an audio optimization may be performed to generate an optimized important sound event (e.g., the optimized important sound event as depicted in the optimized frequency spectrum 320A or the optimized frequency spectrum 320B). In one embodiment, the optimized important sound event may be generated by optimizing the important sound event 499 based on the output audio and the ambient noise. However, this disclosure is not limited thereto.

In a step S430, a sound location analysis may be performed to determine a spatial origin of the important sound event 499 within the environment. In one embodiment, a direction and a distance of the important sound event 499 relative to the user may be determined. In a step S440 and a step S450, a left HRTF and a right HRTF corresponding to a head of the user may be generated to reconstruct a spatial dimension of the important sound event 499 respectively for the left ear and right ear. The left HRTF and the right HRTF may be generated based on a HRTF database 406. However, this disclosure is not limited thereto.

In a step S460 and a step S470, the optimized important sound event with the reconstructed spatial dimension may be output respectively through a left speaker and a right speaker. In this manner, the user may clearly hear the optimized important sound event under the influence of the ambient noise and the output audio. Further, the user may be able to know the direction and the distance of the important sound event 499 through the optimized important sound event, thereby enhancing the safety.

Figure 5:
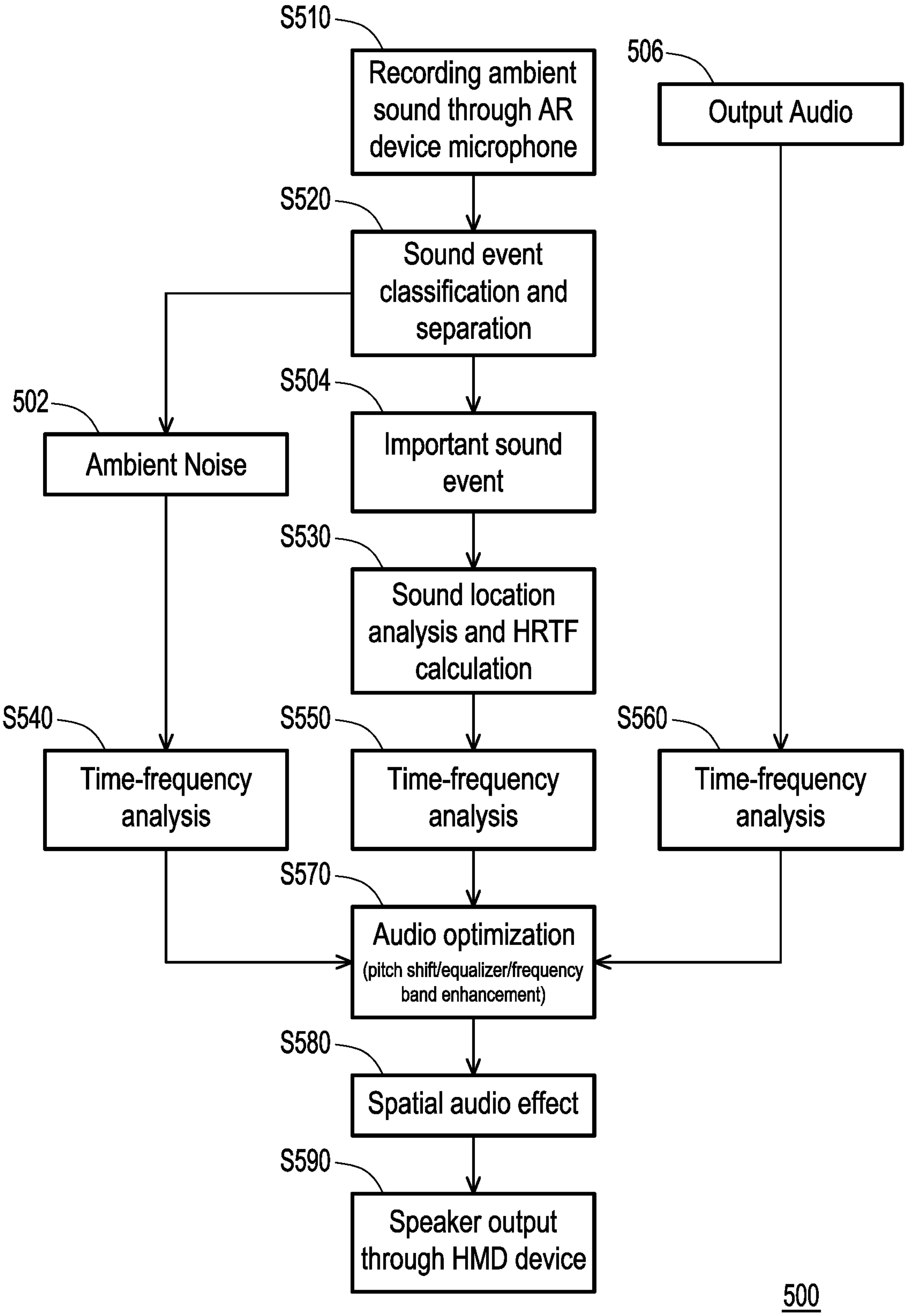
FIG. 5 is a schematic flowchart of an active audio adjustment method according to an embodiment of the disclosure.

FIG. 5 is a schematic flowchart of an active audio adjustment method according to an embodiment of the disclosure. With reference to FIG. 5, an active audio adjustment method 500 is one embodiment of the active audio adjustment method 200. However, this disclosure is not limited thereto.

In a step S510, the ambient sound around the user may be recorded through a microphone of an AR device (e.g., HMD device). In a step S520, the sounds in the ambient sound may be classified (categorized) and separated from each other. In one embodiment, the sounds in ambient sound may be classified as either the ambient noise 502 or the important sound event 504. In a step S530, a sound location analysis may be performed to determine a spatial origin of the important sound event 504 within the environment. Further, the HRTF corresponding to the head of the user may be calculated.

In a step S540, a step S550, and a step S560, a time-frequency analysis may be respectively performed on the ambient noise 502, the important sound event 504, and the output audio 506. Next, in a step S570, based on the analysis result, the important sound event 504 and the output audio 506 may be optimized to generated the optimized important sound event and the optimized output audio. In a step S580, the spatial audio effect may be applied to the optimized important sound event based on the calculated HRTF. In a step S590, the optimized important sound event and the optimized output audio may be output through a speaker of the HMD device.

In addition, the implementation details of the active audio adjustment method 500 may be referred to the descriptions of FIG. 1 to FIG. 4B to obtain sufficient teachings, suggestions, and implementation embodiments, while the details are not redundantly described seriatim herein.

In summary, according to the host 100 and the active audio adjustment method 200, since the output audio and/or the important sound event are optimized, the user may still hear the optimized output audio and/or the optimized important sound event clearly in a noisy or complicated environment, thereby enhancing both immersion and safety.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. An active audio adjustment method, comprising:

receiving, by a host, an ambient sound from a sound pickup device;

analyzing, by the host, the ambient sound to obtain an ambient parameter of the ambient sound and determine an adjustment strategy, wherein the ambient parameter comprises an ambient energy level or an ambient frequency;

adjusting, by the host, an original parameter of an output audio to determine an optimized parameter based on the ambient parameter of the ambient sound and the adjustment strategy, wherein the original parameter comprises an original energy level or an original frequency, the optimized parameter comprises an optimized energy level or an optimized frequency, and the optimized energy level is greater than the ambient energy level or a frequency difference between the optimized frequency and the ambient frequency is greater than a threshold value;

generating, by the host, an optimized output audio based on the optimized parameter; and outputting, by the host, the optimized output audio to an audio output device.

2. The active audio adjustment method according to claim 1, further comprising:

determining the optimized parameter of the optimized output audio by comparing the original parameter of the output audio with the ambient parameter of the ambient sound.

3. The active audio adjustment method according to claim 1, further comprising:

determining the optimized parameter of the optimized output audio utilizing a pre-trained psychoacoustics model.

4. The active audio adjustment method according to claim 1, further comprising:

determining a masking range based on a masking effect of the ambient sound; and determining the optimized parameter of the optimized output audio based on an overlapping frequency band of the masking range and an original frequency band of the output audio.

5. The active audio adjustment method according to claim 1, further comprising:

adjusting the original energy level of the output audio to determine the optimized energy level based on the ambient energy level of the ambient sound, wherein the optimized energy level is greater than the ambient energy level; and adjusting the original frequency of the output audio to determine the optimized frequency based on the ambient frequency of the ambient sound, wherein the frequency difference between the optimized frequency and the ambient frequency is greater than the threshold value.

6. The active audio adjustment method according to claim 1, wherein the ambient sound comprises a plurality of sounds, and the active audio adjustment method further comprises:

categorizing each of the plurality of sounds in the ambient sound as an ambient noise or an important sound event; and determining the optimized parameter based on a noise parameter of the ambient noise and/or an important sound parameter of the important sound event.

7. The active audio adjustment method according to claim 1, wherein the ambient sound comprises a plurality of sounds, and the active audio adjustment method further comprises:

determining each of the plurality of sounds being an important sound event or not based on a sound database.

8. The active audio adjustment method according to claim 1, wherein the ambient sound comprises an important sound event, and the active audio adjustment method further comprises:

determining a direction and a distance of the important sound event relative to a user; and generating an optimized important sound event based on the direction and the distance utilizing a spatial audio effect algorithm.

9. The active audio adjustment method according to claim 8, further comprising:

outputting, by the host, the optimized output audio and the optimized important sound event to the audio output device.

10. A host, comprising:

a storage circuit, configured to store a program code; and a processor, coupled to the storage circuit and configured to access the program code to execute:

receiving an ambient sound from a sound pickup device;

analyzing the ambient sound to obtain an ambient parameter of the ambient sound and determine an adjustment strategy, wherein the ambient parameter comprises an ambient energy level or an ambient frequency;

adjusting an original parameter of an output audio to determine an optimized parameter based on the ambient parameter of the ambient sound and the adjustment strategy, wherein the original parameter comprises an original energy level or an original frequency, the optimized parameter comprises an optimized energy level or an optimized frequency, and the optimized energy level is greater than the ambient energy level or a frequency difference between the optimized frequency and the ambient frequency is greater than a threshold value;

generating an optimized output audio based on the optimized parameter; and outputting the optimized output audio to an audio output device.

11. The host according to claim 10, wherein the processor is further configured to access the program code to execute:

determining the optimized parameter of the optimized output audio by comparing the original parameter of the output audio with the ambient parameter of the ambient sound.

12. The host according to claim 10, wherein the processor is further configured to access the program code to execute:

determining a masking range based on a masking effect of the ambient sound; and determining the optimized parameter of the optimized output audio based on an overlapping frequency band of the masking range and an original frequency band of the output audio.

13. The host according to claim 10, wherein the processor is further configured to access the program code to execute:

adjusting the original energy level of the output audio to determine the optimized energy level based on the ambient energy level of the ambient sound, wherein the optimized energy level is greater than the ambient energy level; and adjusting the original frequency of the output audio to determine the optimized frequency based on the ambient frequency of the ambient sound, wherein the frequency difference between the optimized frequency and the ambient frequency is greater than the threshold value.

14. The host according to claim 10, wherein the ambient sound comprises a plurality of sounds and the processor is further configured to access the program code to execute:

categorizing each of the plurality of sounds in the ambient sound as an ambient noise or an important sound event; and determining the optimized parameter based on a noise parameter of the ambient noise and/or an important sound parameter of the important sound event.

15. The host according to claim 10, wherein the ambient sound comprises a plurality of sounds and the processor is further configured to access the program code to execute:

determining each of the plurality of sounds being an important sound event or not based on a sound database.

16. The host according to claim 10, wherein the ambient sound comprises an important sound event and the processor is further configured to access the program code to execute:

determining a direction and a distance of the important sound event relative to a user; and generating an optimized important sound event based on the direction and the distance utilizing a spatial audio effect algorithm.

* * * * *